United States Patent Office 3,418,270
Patented Dec. 24, 1968

3,418,270
METHOD FOR DISPERSING PIGMENTS
IN POLYETHYLENE
Richard K. Traub, Edgewood, Md., assignor to E. I. du
Pont de Nemours and Company, Wilmington, Del., a
corporation of Delaware
No Drawing. Filed Dec. 22, 1964, Ser. No. 420,424
12 Claims. (Cl. 260—41)

ABSTRACT OF THE DISCLOSURE

There is disclosed a process for preparing pigmented polyolefin compositions containing 1–6% by weight pigment by first preparing a superconcentrate containing 20–45% by weight of the pigment in a copolymer of ethylene with an unsaturated acid, ester, or anhydride, and then extending the superconcentrate by melt-blending with the polyolefin. The ethylene copolymer contains 2–15 mole percent of units derived from the comonomer. The polyolefin used to extend the superconcentrate is either polyethylene or a copolymer of ethylene with a 1-olefin containing 3 to 12 carbon atoms. Carbon black is a preferred pigment for use in the process.

---

This invention relates to an improved process of dispersing pigments in ethylene polymers and to the compositions so produced and, more particularly, to a process of dispersing carbon blacks of small particle size in high density ethylene polymers, and copolymers of ethylene with other 1-olefins.

A variety of techniques is well known for dispersing various types of pigments in polymer matrices. For example, many pigments may be added directly to the polymer matrices by mechanical working to yield satisfactory colored polymers. Other techniques involve the use of pigment pastes employing water, organic liquids or surface-active dispersing agents. Also, it is well known to prepare concentrates of high proportions of pigment in a polymer matrix, followed by dilution of the concentrate by mixing with additional unpigmented polymer. In the case of ethylene polymers, the methods described have met with success in some instances, depending upon the pigment used, the degree of dispersion required, and the use intended for the particular pigmented polymer composition.

The black polyethylene compositions, with which this invention is particularly concerned, are intended primarily for use in jacketing wire and cable. The weatherability of these compositions is improved considerably by the incorporation of well-dispersed carbon black. In fact, the fine channel blacks have been found to provide maximum protection on weathering when well dispersed.

According to the prior art, a typical manufacturing method for producing polymers containing dispersed pigments involves four steps:

(1) Fold-in, (2) dispersion, (3) dilution, (4) extension.

The *fold-in* step produces a superconcentrate which is essentially free of loose pigment. Little or no true dispersion occurs during fold-in. Polyethylene molding flake and the pigment are mixed and melt-blended. This step allows the subsequent dispersion step to progress without free pigment entering the process towards the latter part of the operation which would contaminate the product with undispersed pigment. For this first operation a Banbury mixer is normally employed.

The *dispersion* of pigment in the coarse mixture produced by the fold-in step is the purpose of the subsequent operation. The resultant product is termed a "superconcentrate." Pigment loadings are normally about 40% for this operation since the maximum shear stress produced by such high loading results in maximum dispersing efficiency. Either a Banbury mixer or a compounding roll mill can be used to carry out this step in the processing which must be carried out under conditions of thorough mixing and of high-shear which produce substantial mechanical working.

The *dilution step* involves lowering the pigment concentration of the superconcentrate, usually to about 20–25%. This step has been found to be necessary to decrease the viscosity ratio between the concentrate and the final product in order that the final step of extension can be accomplished. Without dilution, the shear during final extension is not sufficient to disperse completely the concentrate with the result that particles of concentrate contaminate the final product. In the dilution step, solid superconcentrate granules are blended with solid homopolymer flake and then thoroughly mixed by melt-blending. Again, either a Banbury mixer or a compounding roll mill may be used for this operation.

The *extension step* produces the final product containing 1–6% dispersed pigment, usually 2–4% in the case of carbon black. Usually the diluted concentrate, as a molding flake, is blended with the base resin molding flake, both in the solid state, in the correct proportion and then melt-blended under conditions of high shear either by extrusion or roll milling.

This customary process of the prior art is expensive and cumbersome to carry out because of the multiplicity of steps required. Furthermore, the introduction of newer grades of polyethylene having higher, sharper melting points and densities in the range of 0.94 to 0.97 has led to serious difficulties in that dispersions of carbon black satisfactory for uses such as wire and cable insulation cannot be achieved by the methods previously known to the art. This is also true with respect to the high-density copolymers of ethylene with 1-olefins containing from 3 to 12 carbon atoms such as 1-butene, 1-octene, 1-decene and the like.

It has now been discovered that excellent dispersions containing 1–6% of finely divided pigments, particularly blacks such as channel blacks, in high density polyethylene and high density copolymers of ethylene with 1-olefin can be prepared by melt-blending the polyethylene or ethylene copolymer with a superconcentrate containing 20%–45% of the dispersed pigment in a copolymer of ethylene with an unsaturated monomer having a carbonyl group from the class consisting of acids, esters, and anhydrides. This discovery is also valuable in the preparation of pigmented, lower-density (0.915 to 0.935) polyethylene since it has also been found that, by use of a pigment superconcentrate in a polar copolymer of ethylene with an unsaturated carbonyl-containing monomer, a pigmented composition containing 1–6% pigment can be prepared by melt-blending directly with the superconcentrate without the necessity for a dilution step.

Following the process of this invention, a superconcentrate, prepared by melt-blending under conditions of high shear 40% channel black into an ethylene-vinyl acetate copolymer, can be readily extended with low-density ethylene homopolymer to yield a weather-resistant composition containing 2.6% well-dispersed carbon black. Furthermore, the carbon black in the resulting composition is more efficiently dispersed than would result if the composition had been prepared using a superconcentrate based on homopolymer and employing the additional step of dilution, as taught by the prior art. In the case of high-density polyethylenes (densities of 0.95–0.97 (annealed) at 20° C.), the process of this invention is the only method known to applicant for achieving satisfactory dispersion of carbon black to provide weather-resistant compositions; the prior art process has been found incapable of producing sufficiently uniform dispersion to provide weather resistance such as is required for wire and cable coatings.

Rheological studies comparing the melt-flow characteristics of polar copolymer-based superconcentrates and ethylene homopolymer on the one hand and homopolymer-based superconcentrates and ethylene homopolymer on the other, indicate a more favorable relationship, i.e., a lower viscosity ratio, for the former combination. This lower viscosity ratio is one reason why the dilution step can be eliminated since it aids in the achievement of highly dispersed pigmented compositions.

Another phenomenon also evidently is partly responsible for the successful elimination of the dilution step and for the success of this process with high-density polyethylene. This is the fact that the resultant superconcentrate provides a dispersion of the pigment in which the individual particles are substantially completely encapsulated in the polar copolymer. This complete encapsulation can be achieved, it is believed, because the greater polarity of these copolymers enables them to completely wet the surfaces of the pigment, in contrast to the behavior of polyethylene. This encapsulation prevents the tendency towards agglomeration, which is such a notorious problem with fine pigments during dispersion processes, from being realized when the present invention is employed, either with high- or low-density polyethylenes.

The superconcentrates employed in the process of the present invention are prepared by melt-blending under shear 20 to 45 weight percent of a finely divided pigment in the matrix of an ethylene copolymer containing from 2 to 15 mole percent of a polar comonomer having from 3 to 6 carbon atoms and at least one carbonyl oxygen in the monomer, said copolymer having a melt index of from 0.1 to 100 g./10 min., and preferably a melt index from 0.1 to 20 g./10 min. Melt index as used herein is determined by ASTM procedure D–1238–57T.

The comonomers used in the synthesis of the copolymers employed in the preparation of the superconcentrates comprise the polymerizable, olefinically unsaturated acids, esters, and anhydrides, such as, for example, vinyl esters including vinyl acetate and vinyl propionate, $\alpha$-$\beta$-unsaturated acids and esters such as acrylic acid, methacrylic acid, methyl acrylate, ethyl acrylate, methyl methacrylate, ethyl methacrylate, fumaric acid, maleic acid, maleic anhydride, diethyl maleate, ethyl hydrogen maleate, and similar polymerizable, polar, unsaturated carbonyl compounds. The synthesis of copolymers from these monomers and ethylene is described in the literature. Interpolymers, as well as copolymers, employing two or more of these comonomers can be employed in the preparation of the superconcentrates. Where the comonomer is an acid, a portion of the acid groups can be neutralized with a mono- or divalent metal cation. The preferred comonomer when preparing high-density polyethylene blacks is vinyl acetate.

The pigments employed in the present invention may be any of the finely divided or easily pulverizable inorganic or organic compounds normally used as coloring agents. However, in the preparation of polyethylene compositions having a high degree of resistance to weathering, the carbon blacks, particularly the fine channel blacks, are employed. Good dispersions of channel blacks are notoriously difficult to achieve. There are two reasons for this difficulty and they stem primarily from the structural elements of channel blacks. See, for instance, the article by E. M. Dannenberg, M. E. Jordan, and C. A. Stokes in India Rubber World, 122, pp. 663–71 (1950).

Channel blacks have a very lacy structure existing between individual or unit particles. Electron micrographs have shown this structure to be quite substantial and to encompass very large numbers of particles. A good dispersion requires that undispersed concentrations of these structural elements be avoided and also that any gtiven element have polymer wetting the individual particles within that element. If concentrations of the structural elements exist they will show up in polyethylene films under optical microscopic examination as a "grainy" appearance, similar to that observed in high speed photographic film.

The importance of adequate dispersion and the qualitative procedures and tests for comparing degrees of dispersion of carbon blacks in polyethylene are discussed in a pioneering article by V. T. Wallder, W. J. Clarke, J. B. De Coste, and J. B. Howard which appeared in Industrial and Engineering Chemistry, 42, 2320–5 (1950). According to the terminology adopted by these authors, the "grainy" structure of a dispersion of channel black in a thin film of polyethylene is called "background." Background is one of several optical microscopic evaluations which the pigmented product received in order to determine its acceptability for the intended use. The Western Electric Company provides a pregraded standard set of background microscopic slides numbered 1 through 7, with 1 being the best rating and 7 the poorest. Optical comparison with these standard slides still is the only accepted test for degree of carbon black dispersion in polyethylene.

The second feature of carbon black structure is the occasional refractory lump of very dense material. The yield point of material in this category is much higher than the average dispersion system can produce. It, therefore, may carry through the process to show up in the final product as an agglomerate. Agglomerates of undispersed 40% superconcentrate also occasionally contiminate the final product when made according to the prior art. These agglomerates, of either type, necessitate the second specification evalution, that of dispersion or agglomeration. This rating is also qualitative and is based on standard slides provided by the Western Electric Company. Agglomerates are graded 1–10, 1 being the best rating.

Dispersions of carbon black in low density polyethylene made by directly extruding a dry blend of cubes of the polyethylene and the superconcentrate without a dilution step and using superconcentrates based on ethylene homopolymer have Western Electric background and agglomeration ratings of greater than 7 and 10, respectively. However, by employing superconcentrates prepared by the process of the present invention, these ratings are as low as 1.5–2 for background and 3 for agglomeration. As previously noted, dispersions of carbon black in linear polyethylene cannot be made which are satisfactory for weather-resistant-uses from superconcentrates based on high-density polyethylene.

The superconcentrates employed in the process of the present invention can be prepared in a number of ways, all of which are known in the art and several of which were mentioned above. Such blending tchniques include mixing and working the components of the blend under conditions of high shear at a temperature of somewhat above but near the melting point or softening point of the major resin component on a compounding roll mill or in a kneading type mixer such as the Banbury mixer. Another method is to dry blend the pigment with the copolymer component in finely divided form and then to extrude the dry blend through a melt extruder having a screw with a mixing section after the melting section; a number of such mixing extruders are known to the art.

The extension step in the present invention is generally carried out by extrusion using an extruder with a mixing section on the screw, although roll milling can also be employed. Sufficient black concentrate in the carbonyl-containing ethylene copolymer is dry-blended with the homopolymer flake and then the dry blend is melt-blended to yield a pigmented composition, containing from 1 to 6%, based on the total weight of the composition, of uniformly, high dispersed pigment. Loadings of 2 to 4 weight percent are preferred for producing weather-resistant black polyethylenes.

The following examples serve to illustrate particular embodiments of this invention but are not intended to restrict the invention since obvious modifications would occur to one skilled in the art.

Examples I to IV

A copolymer of ethylene and vinyl acetate having a melt index of 14 g./10 min. and containing 6 mole percent vinyl acetate units in the copolymer was blended on a roll mill at a temperature of 150° C. with 40% by weight, based on the total composition, of a standard, commercially available, channel black having a mean particle diameter of 17 millimicrons (m$\mu$) for a period of 20 minutes. The resulting superconcentrate was extended under four different conditions to compositions having a pigment content of 2.6% by melt blending with a low-density (0.923 g./cc.) polyethylene homopolymer having a melt index of 3.7 g./10 min. on a rolling mill. The various conditions used during extension and the degree of dispersion obtained in the final product are summarized in Table I. Accelerated aging was carried out in a weatherometer with unfiltered ultraviolet light, as described in the article by Wallder et al., supra.

Examples A and B

For comparison with the results achieved in Examples I–IV, these two examples are provided in which the superconcentrate was made up in ethylene homopolymer according to the prior art, but then were extended directly to 2.6% carbon black, omitting the dilution step of the prior art in accord with the procedure of Examples I–IV. A superconcentrate mixture of the low-density polyethylene homopolymer used in Examples I–IV and 40% by weight of the same channel black used in Examples I to IV was prepared by dry-blending followed by extrusion through a 3½" extruder at a temperature of 180 to 185° C. The resulting superconcentrate was extended to a composition having a pigment content of 2.6% by melt blending with the same low-density polyethylene homopolymer on a rolling mill. The conditions used during extension and the degree of dispersion obtained in the final product are included in Table I.

process than a concentrate made up in high density polyethylene, although still not well enough). The extended black high density polyethylene made with ethylene vinyl acetate copolymer concentrate in accord with this invention gave a 600-hour durability in the accelerated weathering test as compared with 100 hours for the black extended high-density polyethylene made from a concentrate in low-density polyethylene.

Example VI

The materials and procedures of Example V were employed except that the copolymer superconcentrate was prepared with 40 weight percent carbon black. On extension with linear polyethylene to a pigment level of 2.6%, the composition had a Western Electric Company background rating of 7 compared to a value of 10 for the composition prepared from a 40% superconcentrate based on a low-density ethylene homopolymer.

Examples VII to X

A series of four superconcentrates were prepared by melt-blending 40 weight percent carbon black in selected copolymers on a rolling mill at 150° C. for 20 minutes. The superconcentrates were then extended to 2.6% by blending directly, without a dilution step, with the low-density ethylene homopolymer used in Examples I–IV on the rolling mill for 10 to 20 minutes at 150° C. The compositions were compared and graded on the basis of 1 for the best dispersion, 2 for the next best, etc. The results, which are compared with that obtained for a dispersion similarly prepared with the aid of a low-density ethylene homopolymer superconcentrate (Example C), are summarized in Table II.

TABLE II

| Example | Superconcentrate based on copolymer of— | Weight percent comonomer | Melt index of polymer, g./10 min. | Grade at milling time of— | |
|---|---|---|---|---|---|
| | | | | 10 min. | 20 min. |
| VII | Ethylene/vinyl acetate | 6.0 | 0.7 | 3 | 1 |
| VIII | do | 6.4 | 9.7 | 4 | 4 |
| IX | Ethylene/methacrylic acid | 9.9 | 5.8 | 1 | 2 |
| X | do | 5.3 | 6.7 | 2 | 3 |
| C | Ethylene homopolymer | 0 | 10.0 | 5 | 5 |

Example XI

An ethylene/butene-1 copolymer having a melt index of 0.04, a density of 0.942, and containing 2% by weight of the comonomer was mixed, as molding cubes, with sufficient of a concentrate containing 20% by weight channel black (Monarch "Black Pearls" 74) dispersed in

TABLE I

| Example | Mill speed, s.f.p.m.* | Milling time, minutes | Stock temperature (° F.) | Mill roll surface temp. (° F.) | Western Electric rating | | Accelerated aging hours to embrittlement |
|---|---|---|---|---|---|---|---|
| | | | | | Background | Agglomeration | |
| I | 360 | 10 | 305 | 195 | 3 | 6 | 600 |
| II | 180 | 5 | 250 | 200 | 2.5 | 5 | 600 |
| III | 360 | 3 | 280 | 185 | 2.5 | 3 | 1,800 |
| IV | 180 | 2 | 230 | 175 | 1.5–2 | 6 | 600 |
| Homopolymer concentrate A | 170 | 2 | 280 | 220 | >7 | >10 | <50 |
| Homopolymer concentrate B | 170 | 5 | 270 | 225 | 5 | 9 | 100 |

* Surface feet per minute.

Example V

A superconcentrate of 20 weight percent carbon black in a copolymer of ethylene containing 6 mole percent vinyl acetate units and having a melt index of 1 g./10 min. was prepared by melt-blending in a Banbury mixer. The resulting superconcentrate was dry-blended with linear polyethylene resin having a density of 0.955 g./cc. and a melt index of 1.5 dg./min. The mixture then was extruded through a 3" extruder-mixer to yield a composition having a pigment level of 2.6%. Background as measured by the Western Electric Company standards was 6.5 compared to a background value of 9 and very high agglomerate content for a 2.6% black composition prepared using a low-density ethylene homopolymer superconcentrate (which performs much better in this an ethylene/vinyl acetate copolymer having a melt index of 1.5 and containing 8% vinyl acetate to provide a level of 2.67% black in the extended polymer. This mixture was passed through a mixer-extruder under shear conditions to give the final black copolymer. Comparison of the product as a thin film on a microscopic slide with the Western Electric standards, as previously described, gave a Western Electric rating of 4.5 for agglomeration and 6–7 for background.

Repetition of the above experiment but using a black concentrate of 20% of the same channel black in the ethylene/butene-1 copolymer gave an agglomerate rating of 5–6 and a background rating of ≫7, making it unsuitable for applications requiring outdoor weather resistance.

Example XII

The procedure of Example XI was repeated except that, instead of the ethylene/butene-1 copolymer, an ethylene/octene-1 copolymer having a melt index of 0.06, a density of 0.942, and containing 2% by weight of the octene comonomer was employed. The concentrate employed was 30% by weight of the same channel black in an ethylene/vinyl acetate copolymer having a melt index of 1.5 and containing only 6% of the vinyl acetate comonomer. When extruded in the same manner and to the same level as in Example XI, the Western Electric rating was 3 for agglomerates with a background only slightly over 7.

For comparison, the same ethylene/octene-1 copolymer was mixed with a concentrate of 20% of the carbon black in the ethylene/octene-1 copolymer. This time the agglomerate rating was 4.3 but the background was very bad (much greater than the Western Electric #7 slide) making this composition unsuitable for applications requiring outdoor exposure.

The foregoing examples have demonstrated an improved method of dispersing carbon blacks in polyolefins by direct extension of concentrates to compositions with the desired level of pigmentation. The process of this invention for the first time provides a method for obtaining high-density polyethylene black having sufficient resistance to weathering to make them acceptable for wire and cable applications. Polyolefins colored with a wide variety of pigments for making household articles and toys also can be made advantageously by this process. The black pigmented polyolefin compositions so produced have improved resistance to the effects of weathering and find use as insulation material for wire and cable. In addition, the pigmented polyolefin can be extruded into a variety of shapes among which are included pipe and film. The properties of these compositions may be further improved by the addition of polyolefin modifiers such as antioxidants, lubricants, and other known modifiers.

I claim:

1. A process for the preparation of pigmented polyolefin compositions containing 1–6% by weight of a uniformly dispersed pigment which comprises preparing a homogeneous superconcentrate containing 20 to 45% by weight of uniformly dispersed pigment in a copolymer of ethylene with a polar, unsaturated, carbonyl-containing comonomer having 3 to 6 carbon atoms in the molecule and selected from the class consisting of unsaturated acids, esters, and anhydrides, said copolymer comprising from 2 to 15 mole percent of units derived from said polar, unsaturated carbonyl-containing comonomer, by melt-blending under high shear and subsequently extending the resultant superconcentrate by melt blending with sufficient of a polyolefin selected from the group consisting of ethylene homopolymer and copolymers of ethylene with 1-olefins having from 3 to 12 carbon atoms to provide the final pigmented polyolefin.

2. The process of claim 1 wherein the pigment is a finely-divided carbon black.

3. The process of claim 2 wherein the polyolefin employed to extend the superconcentrate is a high-density polyethylene homopolymer.

4. The process of claim 2 wherein the polyolefin employed to extend the superconcentrate is a copolymer of ethylene and 1-butene.

5. The process of claim 2 wherein the polyolefin employed to extend the superconcentrate is a copolymer of ethylene and 1-octene.

6. The process of claim 2 wherein the ethylene copolymer employed in the superconcentrate is a copolymer of ethylene and vinyl acetate.

7. The process of claim 2 wherein the ethylene copolymer employed in the superconcentrate is a copolymer of ethylene and methacrylic acid.

8. A process for the preparation of weather-resistant, black polyolefin compositions by preparing a homogeneous superconcentrate containing 20–45% by weight of uniformly dispersed, finely divided carbon black in a copolymer of ethylene with vinyl acetate, said copolymer comprising 2–15 mole percent of units derived from the vinyl acetate comonomer, by melt-blending under high shear, and subsequently extending the resultant superconcentrate by melt-blending with sufficient of a polyolefin selected from the class consisting of ethylene homopolymer and copolymers of ethylene with 1-olefins having from 3 to 12 carbon atoms to provide a final black polyolefin composition containing 2–4% by weight of carbon black.

9. The process of claim 8 wherein the extending is accomplished by melt-blending and extruding the extended black polyethylene.

10. The process of claim 8 wherein the polyolefin employed to extend the superconcentrate is a high-density polyethylene.

11. The process of claim 8 wherein the polyolefin employed to extend the superconcentrate is a copolymer of ethylene and 1-butene.

12. The process of claim 8 wherein the polyolefin employed to extend the superconcentrate is a copolymer of ethylene and 1-octene.

References Cited

UNITED STATES PATENTS

| | | | |
|---|---|---|---|
| 3,206,419 | 9/1965 | Pritchard et al. | 260—41 |
| 3,248,359 | 4/1966 | Maloney | 260—897 XR |

FOREIGN PATENTS

| | | |
|---|---|---|
| 582,093 | 11/1946 | Great Britain. |

MORRIS LIEBMAN, *Primary Examiner.*

J. H. DERRINGTON, *Assistant Examiner.*

U.S. Cl. X.R.

260—897; 106—307, 308